US008509247B2

(12) United States Patent
Kunimatsu (10) Patent No.: US 8,509,247 B2
(45) Date of Patent: Aug. 13, 2013

(54) COMMUNICATION METHOD AND APPARATUS

(75) Inventor: Makoto Kunimatsu, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 12/188,951

(22) Filed: Aug. 8, 2008

(65) Prior Publication Data

US 2009/0060164 A1 Mar. 5, 2009

(30) Foreign Application Priority Data

Aug. 27, 2007 (JP) .................................. 2007-219922

(51) Int. Cl.
*H04L 12/28* (2006.01)
*H04L 12/56* (2006.01)
*H04M 7/00* (2006.01)

(52) U.S. Cl.
USPC ...... 370/401; 370/289; 370/392; 379/221.02; 379/221.14

(58) Field of Classification Search
USPC ............ 370/401; 709/227–229; 379/221.02, 379/221.14
See application file for complete search history.

(56) References Cited

U.S. PATENT DOCUMENTS

| 6,571,277 | B1 * | 5/2003 | Daniels-Barnes et al. ..... 709/213 |
| 7,474,673 | B1 * | 1/2009 | Kennealy ....................... 370/466 |
| 8,307,082 | B2 * | 11/2012 | Majanen et al. .............. 709/224 |
| 2006/0098634 | A1 * | 5/2006 | Umemoto et al. ............. 370/352 |
| 2008/0176552 | A1 * | 7/2008 | Hamano et al. ............ 455/422.1 |

FOREIGN PATENT DOCUMENTS

| JP | 2005-33528 | 2/2005 |
| WO | WO 2007043180 | * 4/2007 |

OTHER PUBLICATIONS

Rosenberg et al, "RFC 3264: An Offer/Answer Model with the Session Description Protocol (SDP)", Jun. 2002, The Internet Society.*

* cited by examiner

*Primary Examiner* — Ronald Abelson
(74) *Attorney, Agent, or Firm* — Fizpatrick, Cella, Harper & Scinto (57) ABSTRACT

A router of a first network and a router of a second network are connected to a third network. A connection request including information relating to the direction of communication performed by a first service provider that exists on the first network is transmitted from the first network to the second network via the third network. On the basis of the information relating to the direction of communication included in the connection request transmitted from the first network to the second network, a second service provider that exists on the second network is selected and a response that includes identification information of the selected second service provider is transmitted from the second network to the first network via the third network.

15 Claims, 9 Drawing Sheets

```
<?xml version="1.0"?>
<root xmlns="urn:schemas-upnp-org:device-1-0">
:
<device>
    <deviceType>urn:schemas-upnp-org:device:MediaServer:1</deviceType>
:                                                          702
</device>
<ServiceList>
<service>
:
<SCPDURL>http://192.168.1.101/service.xml</SCPDURL>
:                              707
</service>
:
</device>
```
703

```
<?xml version="1.0"?>
<root xmlns="urn:schemas-upnp-org:device-1-0">
:
<device>
    <deviceType>urn:schemas-upnp-org:device:MediaRenderer:1</deviceType>
:                                                            704
</device>
<ServiceList>
<service>
:
<SCPDURL>http://192.168.1.102/service.xml</SCPDURL>
:
</service>
:
</device>
```
705

```
<?xml version="1.0"?>
<root xmlns="urn:schemas-upnp-org:device-1-0">
:
<device>
    <deviceType>urn:schemas-upnp-org:device:Printer:1</deviceType>
:                                                     706
</device>
<ServiceList>
<service>
:
<SCPDURL>http://192.168.1.103/service.xml</SCPDURL>
:
</service>
:
</device>
```

FIG. 8

| SDP MEDIA INFORMATION -MEDIA TYPE | UTILIZABLE SERVICE PROVIDER | 801 |
|---|---|---|
| audio | DMP, DMS, DMR | |
| video | DMP, DMS, DMR | |
| application | DMP, DMS, DMR, DMPr | |
| data | NONE | |
| control | NONE | |

| SDP MEDIA INFORMATION -FORMAT | UTILIZABLE SERVICE PROVIDER | 802 |
|---|---|---|
| JPEG | DMP, DMS, DMR, DMPr | |
| LPGM | DMP, DMS, DMR | |
| MPEG-2 | DMP, DMS, DMR | |

| SDP MEDIA INFORMATION -COMMUNICATION DIRECTION | UTILIZABLE SERVICE PROVIDER | 803 |
|---|---|---|
| sndonly | DMP, DMR, DMPr | |
| rcvonly | DMS | |
| sendrecv | DMP, DMS, DMR | |

FIG. 9

```
START
  ↓
ACQUIRE IP ADDRESS AND PORT         ~S901
NUMBER OF SERVICE PROVIDER USED
  ↓
EXECUTE PROCESSING FOR              ~S902
DECIDING VALUE OF COMMUNICATION
DIRECTION FROM CONTENT OF
SERVICE PROVIDER USED
  ↓
GENERATE CHARACTER-STRING DATA      ~S903
  ↓
END
```

FIG. 10

| SERVICE TYPE | VALUE OF COMMUNICATION DIRECTION |
|---|---|
| DMP | recvonly |
| DMS | sendonly |
| DMR | sendrecv |
| DMPr | recvonly |

COMMUNICATION METHOD AND APPARATUS

BACKGROUND OF THE INVENTION

1. Field of the Invention

The present invention relates to a communication method and apparatus.

2. Description of the Related Art

In addition to personal computers and mobile telephones, such devices as digital TVs, digital camera and digital video recorders also now come equipped with a communication function. This means that even the home can have a network that includes a plurality of communication apparatuses.

Further, the foundation is now being laid for a system in which once a call has been set up using a call control protocol, the above-mentioned communication apparatus is connected to a communication apparatus on a different network so that these may communicate with each other.

In Japanese Patent Application Laid-Open No. 2005-033528, for example, a service provider candidate list of service providers used by a first network is transmitted to a second network. The second network creates a service provider candidate list that matches the service provider candidate list received from the first network and sends the created candidate list back to the first network. The user on the side of the first network selects a suitable service provider from the list that has been sent back.

In a case where a plurality of communication apparatuses exist on a network, it is necessary to select a second service provider that is suited to the functions of a first service provider in order that the first and second service providers may be connected and perform data communication for a prescribed purpose.

For example, a service provider that reproduces video data cannot perform the intended data communication unless it is connected to a service provider that transmits video data. A service provider that reproduces video data is, for example, a digital TV, and a service provider that transmits video data is, for example, a digital video recorder.

If unsuited service providers are selected, the selected service providers may not be capable of communicating with each other.

SUMMARY OF THE INVENTION

The present invention selects an appropriate service provider that corresponds to a service provider on the side of another party.

One aspect of the present invention provides a method for performing communication between a first network and a second network via a third network to which a router of the first network and a router of the second network are connected, the method comprising transmitting a connection request, which includes communication-direction information indicating the direction of communication of a first service provider that exists on the first network, from the first network to the second network via the third network, selecting a second service provider, which exists on the second network, based upon the communication-direction information and transmitting identification information, which identifies the selected second service provider, from the second network to the first network via the third network.

Further features of the present invention will become apparent from the following description of exemplary embodiments with reference to the attached drawings.

DESCRIPTION OF THE EMBODIMENT

Figure 1:
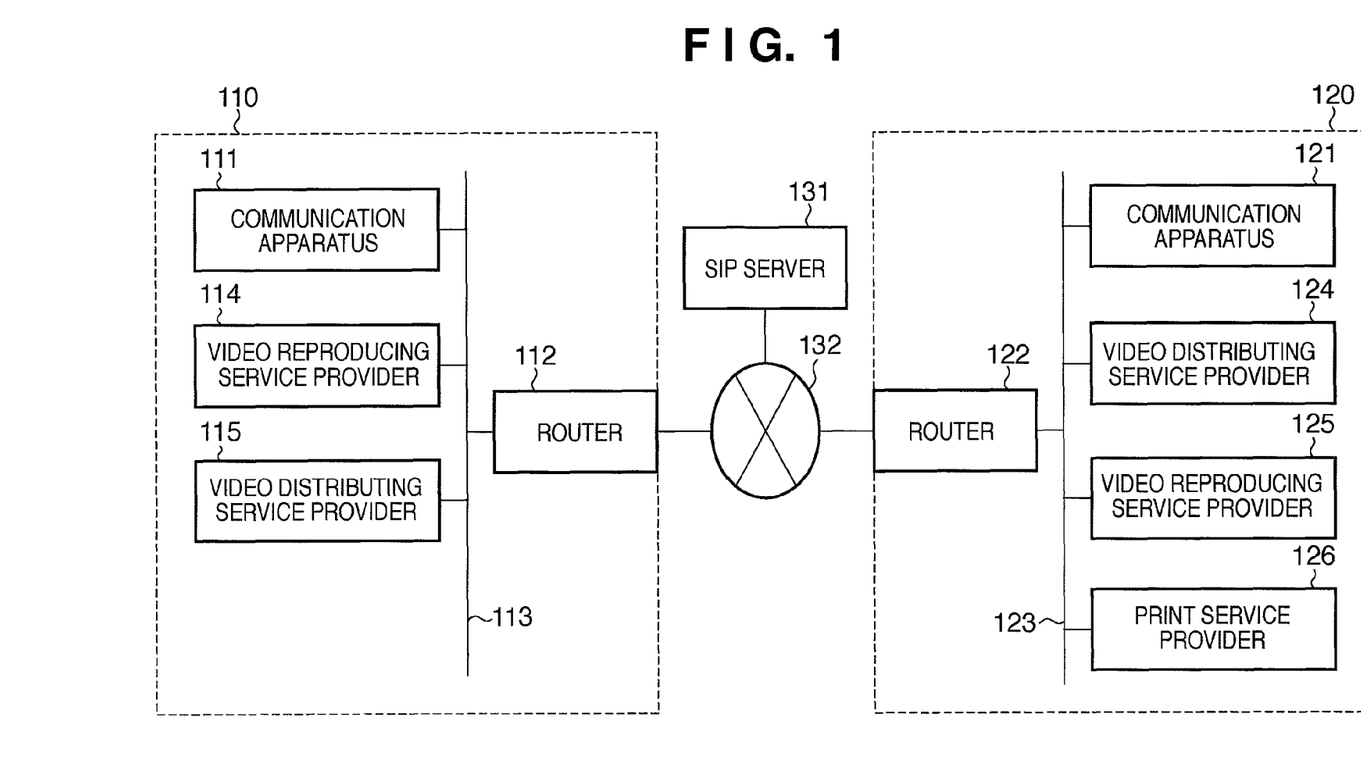
FIG. 1 is a diagram illustrating the configuration of a system for implementing a communication method as an embodiment of the present invention.

Reference will be had to FIG. 1 to describe the connection relationship between communication apparatuses, which execute a communication control method according to an embodiment of the present invention, and service providers.

A first network 110 and a second network 120 are connected to the Internet 132. The first network 110 and second network 120 are connected to the Internet 132 with a router 112 and a router 122, respectively, serving as gateways.

In the first network 110, a communication apparatus 111, a video reproducing service provider 114 and a video distributing service provider 115 are connected by a local-area network (LAN) 113. The service providers can also be referred to as service providing terminals. In this embodiment, a digital TV can be mentioned as one example of the video reproducing service provider 114, which provides a video reproduction service. A digital recorder can be mentioned as one example of the video distributing service provider 115, which provides a video distribution service. It will suffice if the service providers are devices that can be equipped with hardware and programs that provide the respective services. For example, the video distributing service provider may be a server that relies upon a personal computer, and a device that provides the video reproduction service may be a mobile telephone, etc. Further, the video reproducing service provider 114 in this embodiment is a DMP (Digital Media Player) stipulated by DLNA. DLNA is the Digital Living Network Alliance (http://www.dlna.org/). Further, the video distributing service provider 115 is a DMS (Digital Media Server) stipulated by DLNA.

In a manner similar to the first network 110, a communication apparatus 121 and service providing terminals serving as service providers are connected by a LAN 123 in the second network 120. The service providing terminals connected to the second network 120 are a video distributing service provider 124, a video reproducing service provider 125 and a print service provider 126.

In this embodiment, the video distributing service provider 124 is a DMS (Digital Media Server) stipulated by DLNA. An example is a digital recorder.

The video reproducing service provider 125 is a DMP (Digital Media Player) stipulated by DLNA. An example is a digital TV.

The print service provider 126 is a printer stipulated by DLNA. As with each of the devices of the first network, it will suffice if the devices of the second network can be equipped with hardware and programs for providing each of the services.

Furthermore, a SIP server 131 is connected to the Internet 132. SIP (Session Initiation Protocol) has its specifications established by the IETF (Internet Engineering Task Force) and is a publicly disclosed call control protocol.

Figure 12:
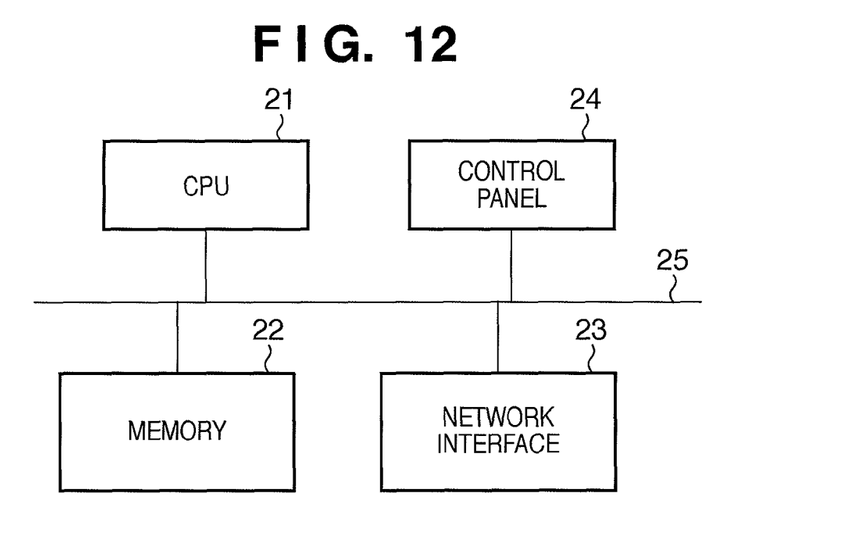
FIG. 12 is a block diagram of a communication apparatus.

A block diagram of the communication apparatuses 111, 121 of this embodiment is shown in FIG. 12.

The apparatus in FIG. 12 includes a CPU 21 of a computer, a memory 22, a network interface 23, a control panel 24 and a bus 25. A program has been stored in the memory 22 in such a manner that it can be read out by the CPU 21. The CPU 21 operates in a manner described later by reading this program out of the memory 22 and then executing the program. The network interface 23 connects the LANs 113 and 123. The control panel 24 includes a display device and keyboard.

It should be noted that the SIP server 131 also has a configuration similar to that of the communication apparatuses 111, 121 illustrated in FIG. 12.

Further, the video reproducing service provider 114 has a service executing section, which executes the video reproduction service, connected to the bus 25 in the block diagram of FIG. 12. Similarly, the video distributing service provider 115, video distributing service provider 124, video reproducing service provider 125 and print service provider 126 have service executing sections for executing the respective services.

In the block diagram of FIG. 12, the network interface 23 for connecting the LANs 113, 123 is provided. On the other hand, FIG. 1 differs from FIG. 12 in that the routers 112, 122 connect the LANs 113, 123 and the Internet 132 at the network interface 23.

Figure 2:
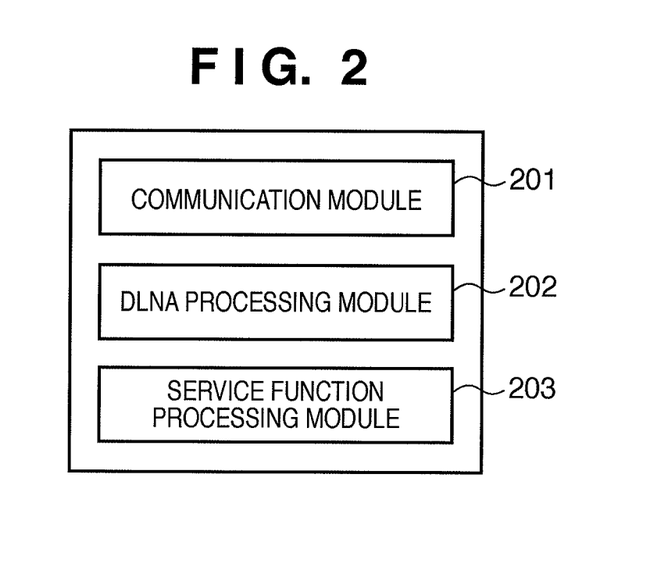
FIG. 2 illustrates the module configuration of a service provider.

Next, an example of the function module configuration internally of the service providers will be described with reference to FIG. 2. The video reproducing service provider 114, video distributing service provider 115, video distributing service provider 124, video reproducing service provider 125 and print service provider 126 each have the module configuration illustrated in FIG. 2.

Each of the service providers has a communication module 201, a DLNA processing module 202 and a service function processing module 203. These modules are function modules implemented by having the CPU 21 execute programs in the memory 22. The DLNA processing module 202 executes DLNA processing, and the service function processing module 203 is a module in which a service is implemented on a per-device basis. The video reproducing service provider 114 has a processing function for receiving and reproducing video data. The video distributing service provider 115 has a processing function for transmitting video data. The print service provider 126 has a function for printing received data.

Figure 3:
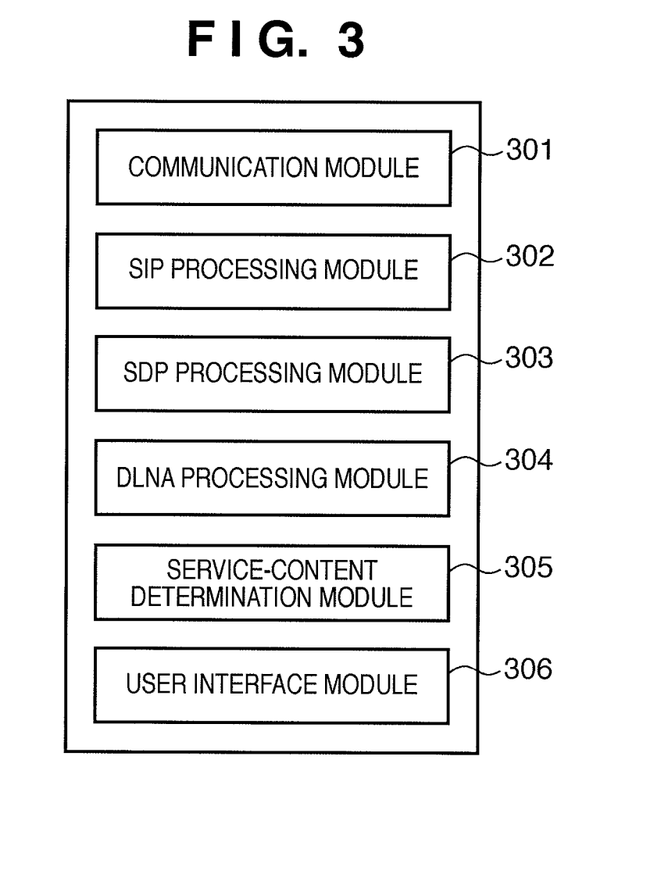
FIG. 3 illustrates an example of the module configuration of a communication apparatus for executing the method of the present invention.

Next, reference will be had to FIG. 3 to describe an example of the module configuration of communication apparatus 111 and communication apparatus 121 according to this embodiment.

The communication apparatus 111 and communication apparatus 121 have a communication module 301, an SIP processing module 302, an SDP processing module 303, a DLNA processing module 304, a service-content determination module 305, and a user interface module 306. These modules are function modules implemented by having the CPU 21 execute programs in the memory 22. It should be noted that SDP (Session Description Protocol) has specifications established by the IETF (Internet Engineering Task Force) and is a publicly disclosed protocol that describes the content of a session.

The communication module 301 receives various data from the LANs 113, 123 and transmits various data to the LANs 113, 123.

The SIP processing module 302, SDP processing module 303 and DLNA processing module 304 are modules for executing the above-mentioned SIP, SDP and DLNA processing, respectively.

For example, upon receiving SDP information, the communication module 301 delivers the received SDP information to the SDP processing module 303. The SDP processing module 303 generates SDP information and delivers the generated SDP information to the communication module 301. The communication module 301 sends the LANs 113, 123 the SDP information delivered from the SDP processing module 303.

The details of the service-content determination module 305 and user interface module 306 will be described later.

These modules are implemented by having the CPU 21 read and execute programs stored in the memory 22.

Thus, the communication apparatus 121 is a communication apparatus on the second network 120, which is different from the first network 110. The communication apparatus 121 has the communication module 301 for receiving SDP information. Furthermore, the communication apparatus 121 has the service-content determination module 305 for selecting a second service, which is present on the second network 120, based upon communication-direction information contained in the received SDP information, as will be described later.

Further, the communication apparatus 121 has the SDP processing module 303 for generating the SDP information. The communication module 301 of the communication apparatus 121 sends the first network 110 the SDP information generated by the SDP processing module 303.

Figure 4:
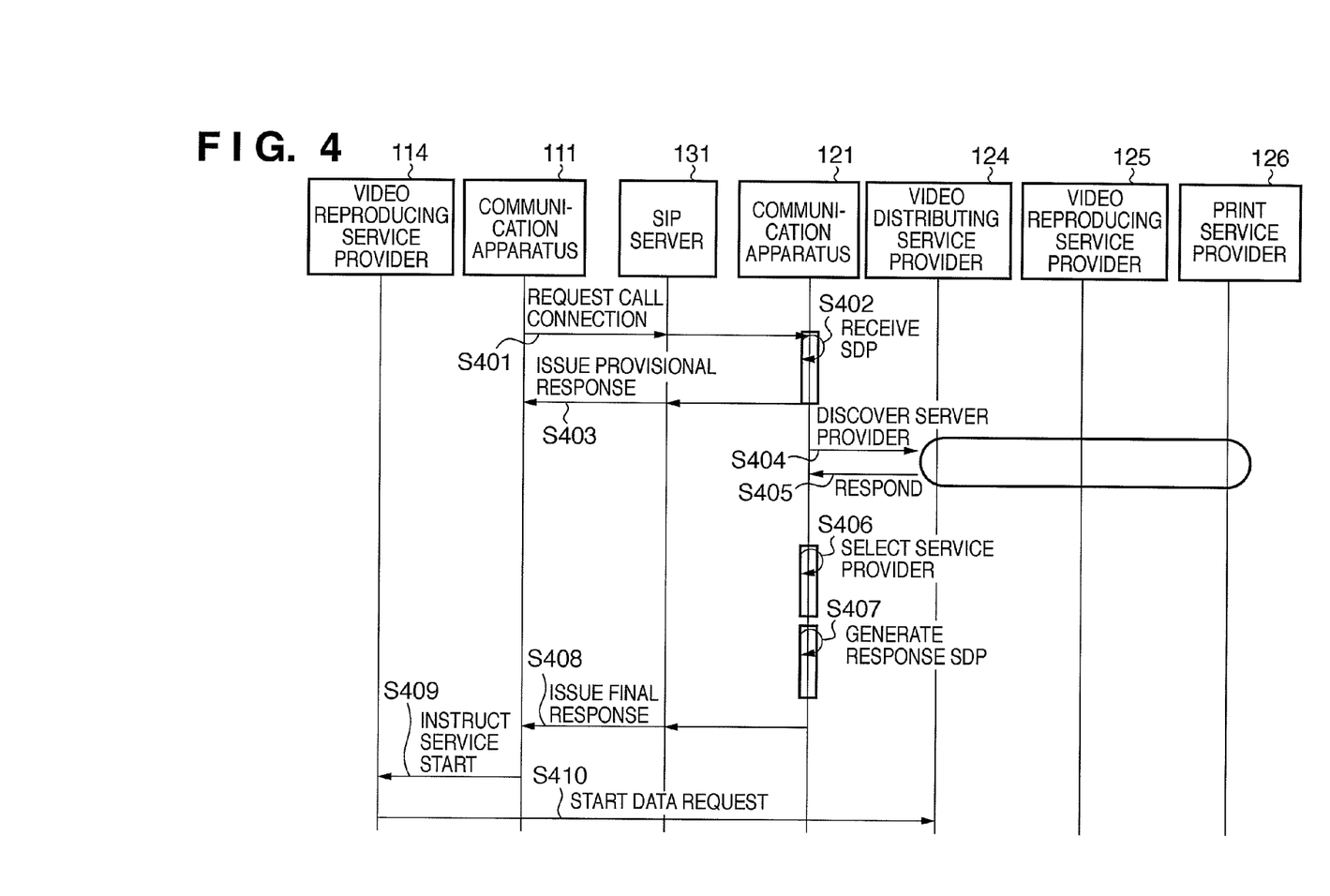
FIG. 4 illustrates an operation sequence according to the embodiment.

Reference will be had to FIG. 4 to describe an example of a sequence through which a first service provided in the first network and an appropriate service provider in the second network perform data communication.

In this example, the video reproducing service provider 114 and video distributing service provider 124 are connected. Further, in this example, the side of the first network is the side that issues a connection request, and the second network is the side that receives the incoming connection request.

First, at S401 in the sequence, the communication apparatus 111 of the first network transmits an SIP call connection request to the communication apparatus 121 of the second network in response to a start trigger from the user. The call connection request contains SDP information. At S402, the communication apparatus 121 that has received the call connection request receives the SDP information and sends a provisional response back to the communication apparatus of the first network at S403. The SDP information is definition data that defines communication by the video reproducing service provider 114 present on the first network 110. The user designates the communication apparatus 121 and video reproducing service provider 114 and issues the call connection request. The SDP information contained in the call connection request is generated on the basis of the fact that the video reproducing service provider 114 provides DMP (a data reception service), that the media type is video and that the media format is JPEG.

Figure 6:
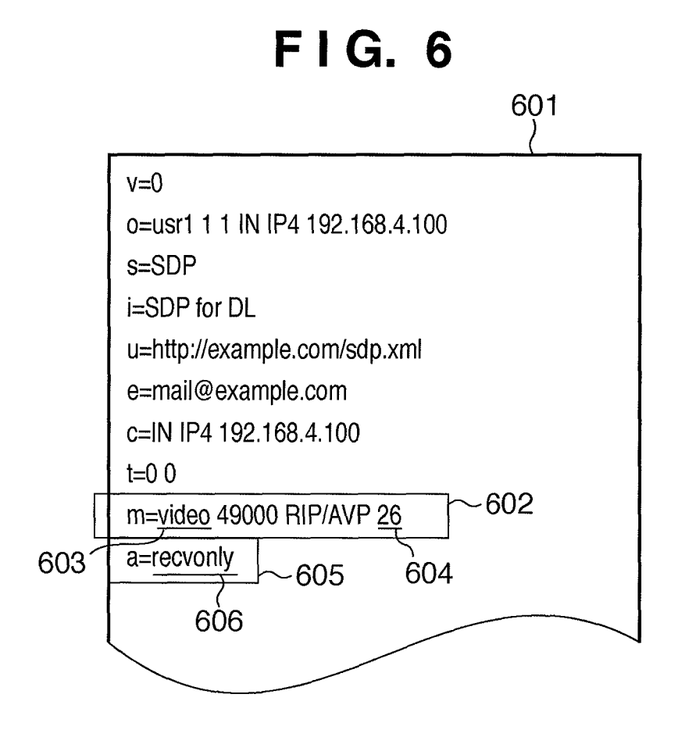
FIG. 6 illustrates SDP information received at the time of a call setup request according to the embodiment.

The SDP information received in this embodiment is indicated at 601 in FIG. 6. It will suffice if the format of the SDP information complies with specifications publicly disclosed by the IETF. The details will be described later.

At S404 of the sequence diagram, the communication apparatus 121 searches for a service provider on the second network using SSDP. SSDP (Simple Service Discovery Protocol) has its specifications established by the IETF and is a publicly disclosed service discovery protocol.

Figure 7:
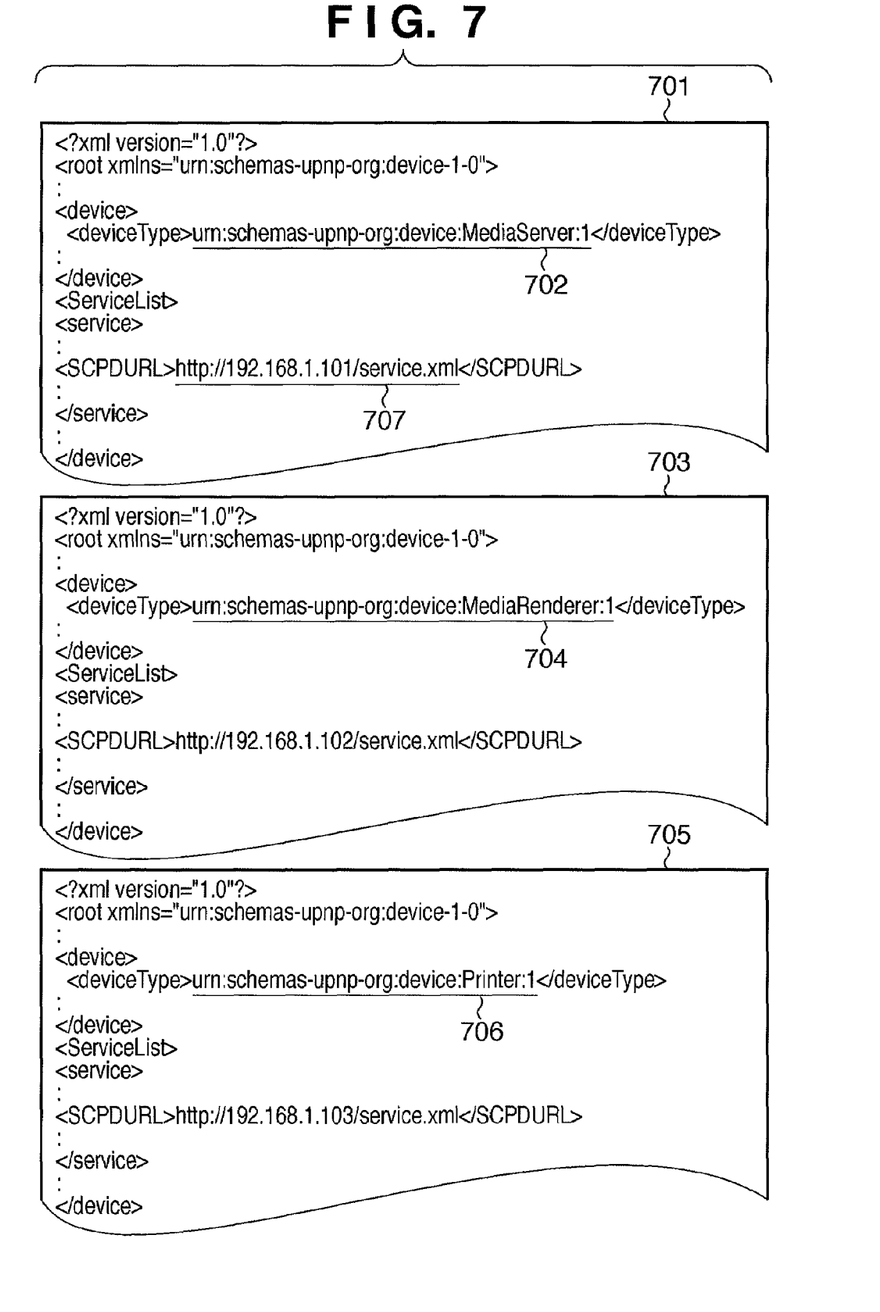
FIG. 7 illustrates information obtained when a search for a service provider is conducted according to the embodiment.

At S405, the communication apparatus 121 receives the result of the search conducted at S404. A list of received information is shown in FIG. 7.

Reference numeral 701 denotes part of the information provided by the video distributing service provider 124. That this service is the video distribution service can be ascertained from a character string 702. Reference numeral 703 denotes part of the information provided by the video reproducing service provider 125. That this service is the video reproduction service can be ascertained from a character string 704. Reference numeral 705 denotes part of the information provided by the print service provider 126. That this service is the video reproduction service can be ascertained from a character string 706.

The formats of the items of information 701, 703 and 705 are as specified and disclosed by the UPnP Forum (http://www.upnp.org/).

At S406 in of the sequence diagram, the communication apparatus 121 of the second network selects the appropriate service from the result of service discovery received at S405 and the SDP information received at S402. Here the video distributing service provider 124 is selected. At S407, the communication apparatus 121 generates SDP information, which is sent back to the communication apparatus 111 of the first network, based upon the service information selected at S406. The details of S406, S407 will be described later.

At S408, the communication apparatus 121 of the second network appends the SDP information generated at S407 and sends the final response to the SIP call connection request back to the communication apparatus 111, whereby the call connection is established. Thus, the response SDP information (second definition data that defines the communication by the video distributing service provider 124) is transmitted to the first network 110. Here the first network 110 and second network 120 are connected via the communication apparatus 111 and communication apparatus 121.

At S409, the communication apparatus 111 sends a service-start trigger to the video reproducing service provider 114 used by the first network. The trigger includes the SDP information contained in the final response. At S410, the video reproducing service provider 114 of the first network begins requesting data of the video distributing service provider 124 of the second network so that data communication between the services starts. It should be noted that the service request reaches the video distributing service provider 124 via the communication apparatus 111 and communication apparatus 121.

Thus, as set forth above, a call is established using the call control protocol from the first network 110 to the second network 120. The video reproducing service provider 114 in the first network 110 and the video distributing service provider 124 in the second network 120 then perform data communication. The communication apparatus 121 in the second network 120 receives the SDP, which describes the information regarding the data communication of the video reproducing service provider 114, using the SIP, which is the call control protocol (S402). Further, the communication apparatus 121 searches for the service by the service discovery protocol using the received SDP information (S404, S405, S406). The communication apparatus 121 generates the response. SDP, which is data capable of being transmitted by SIP, from the information concerning the video distributing service provider 124 obtained by the service search.

The foregoing is a sequence of steps up to the point where the first and second services are capable of performing data communication.

The sequence of FIG. 4 includes a procedure (S406 of the sequence diagram) for selecting an appropriate service and a procedure (S407) for generating response SDP information. The details of S406 and S407 will now be described in order.

Figure 5:
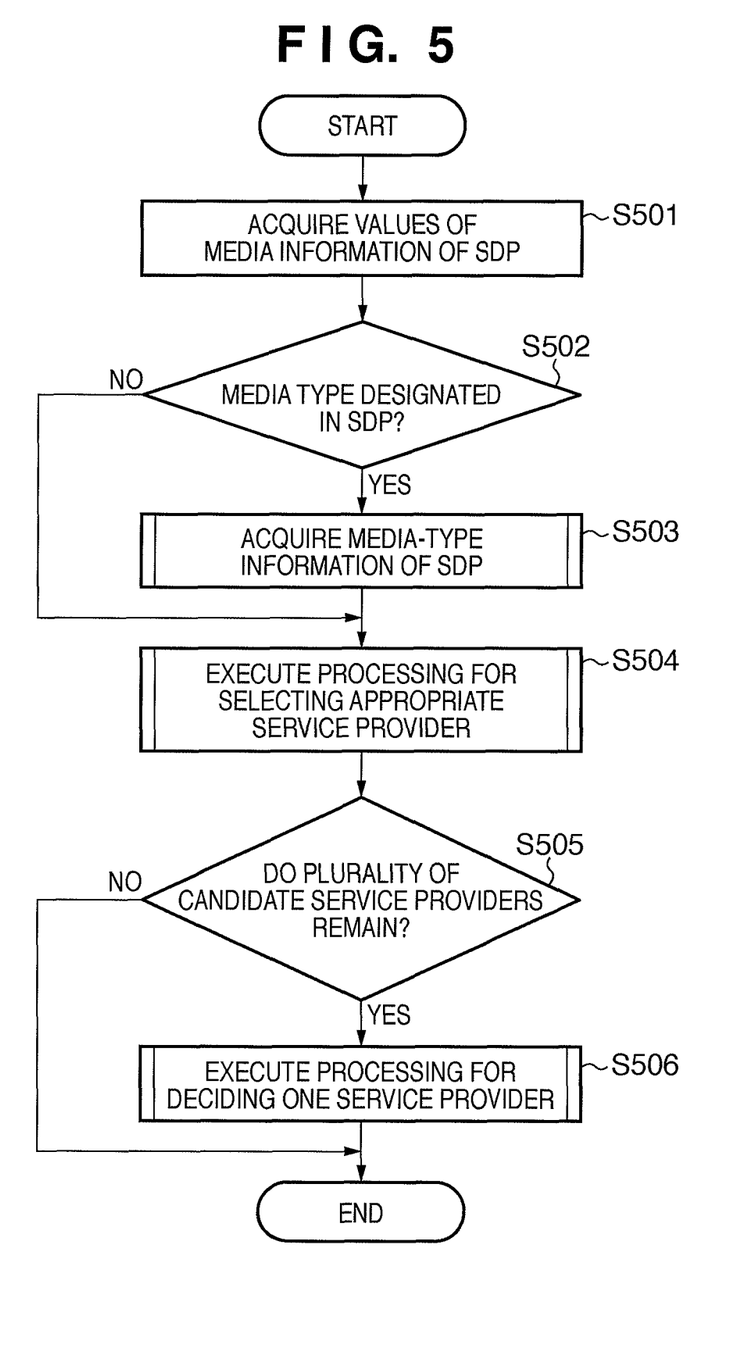
FIG. 5 is a flowchart of processing for selecting an appropriate service provider.

FIG. 5 is a flowchart of a procedure (S406 in FIG. 4) for selecting an appropriate service. This process is executed by the service-content determination module 305. The steps of this flowchart will now be described.

First, at step S501, the media information values (portion 602 in FIG. 6) are acquired from the received SDP information.

Furthermore, whether the media type has been designated in the SDP information is determined (step S502). If the media type has been designated, media-type information (603 in FIG. 6) is acquired (step S503). The fact that the media type is video has been designated in section 603 in FIG. 6.

Next, by using the acquired SDP information, the appropriate service is selected from the services acquired at S405 of the sequence diagram (step S504). The processing of step S504 will be described below in detail.

First, the media-type information 603 and format information 604 is extracted from the media information of the received SDP information. Further, communication-direction information 606 is extracted from media-attribute information 605.

Figure 8:
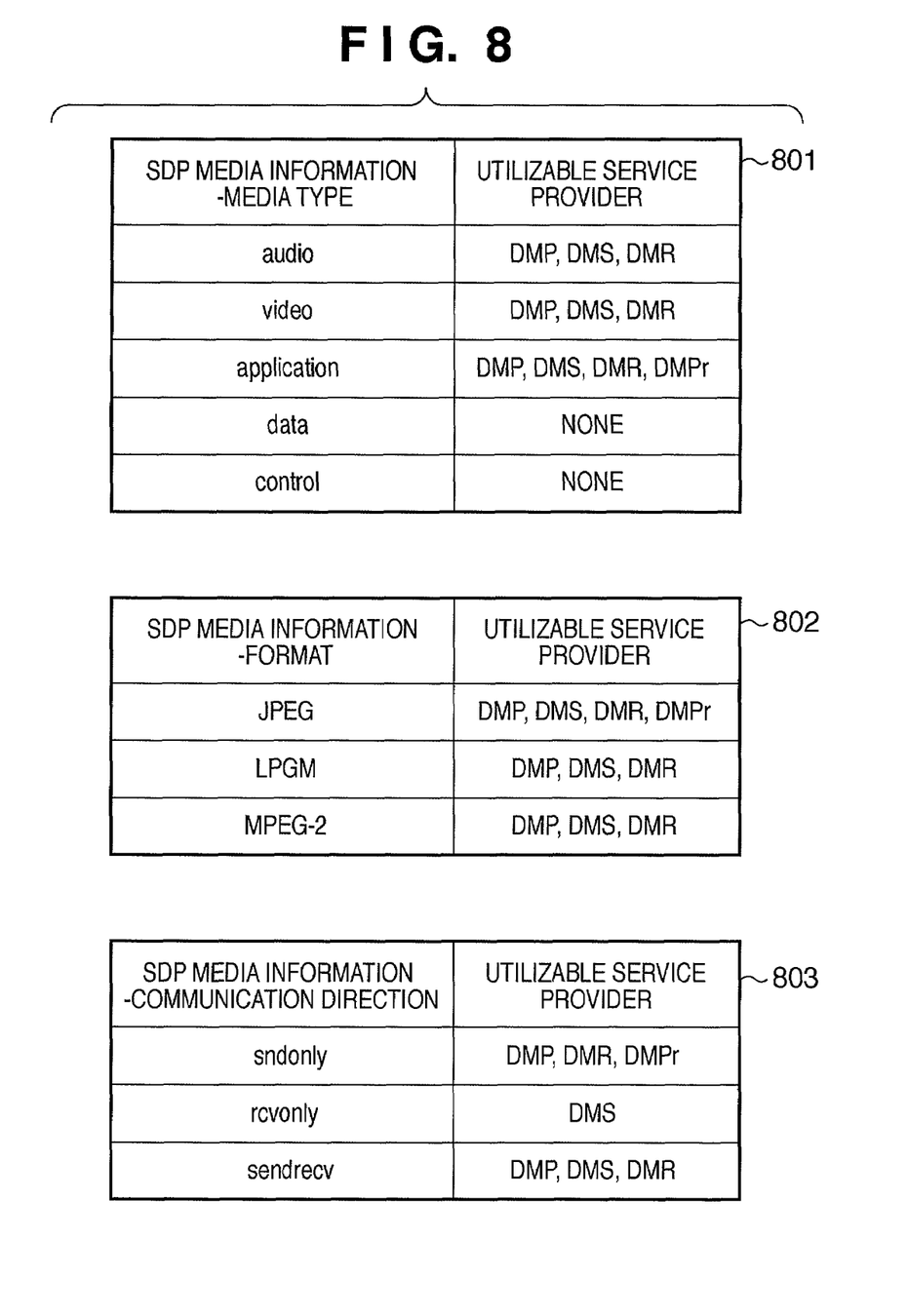
FIG. 8 illustrates tables for selecting an appropriate service provider.

Further, appropriate-service determination tables shown in FIG. 8 are provided in the service-content determination module 305 beforehand.

A table 801 is a table for selecting a candidate for an appropriate service from the media-type (data-type) information included in the media information of the SDP information. Stored in the table 801 is information indicating, by way of example, that services capable of supporting "video" are "DMP" (Digital Medial Player), "DMS" or "DMR" (Digital Media Renderer).

A table 802 is a table for selecting an appropriate service from the (data) format information included in the media information of the SDP information. Stored in the table 802 is information indicating, by way of example, that services capable of supporting "JPEG" are "DMP", "DMS", "DMR" or "DMPr" (Digital Media Printer).

A table 803 is a table for selecting a candidate for appropriate service from the communication-direction information included in the media-attribute information of the SDP information. Stored in the table 803 is information indicating, for example, that in the case of "recvonly" (mainly reception type), DMS (server service) is the candidate.

First, the fact that "DMP", "DMS" or "DMR" are candidates is determined by comparing the character string "video" in the extracted media-type information 603 and the table 801. The service for handling the designated media type is adopted as the candidate by the media-type information at this step. In this embodiment, an example in which a candidate is selected in advance using tables is illustrated. However, use may be made of a method in which a list of utilizable services is created dynamically and a candidate is selected from this list, by way of example.

Next, the fact that "DMP", "DMS", "DMR" or "DMPr" are candidates is determined by comparing a character string "26" in the format information 604 and the table 802. The character string "26" of the format information 604 signifies "JPEG" according to specifications established and disclosed by the IANA (Internet Assigned Numbers Authority). The service for handling the designated format is adopted as the candidate by the media-format information at this step. In this embodiment, an example in which a candidate is selected in advance using tables is illustrated. However, use may be made of a method in which a list of services capable of utilizing the format of the designation is created dynamically and a candidate is selected from this list, by way of example.

Furthermore, the fact that DMS, which is a service for transmitting data, is the candidate is determined by comparing the character string "recvonly" in the communication-direction information 606 ("recvonly" mainly signifies "receive only" according to specifications established and disclosed by the IETF) with the table 803. The service is selected by the communication-direction information at this step. In this embodiment, an example in which a candidate is selected in advance using tables is illustrated. However, by way of example, use may be made of a method in which a list of utilizable services is created dynamically and a candidate is selected from this list.

The fact that DMS is the service candidate is determined by the foregoing operation.

Next, information that provides the DMS is found from the list (FIG. 7) acquired at S405 of the sequence diagram. In this embodiment, only information 701 in FIG. 7 is selected.

The video distributing service provider 124 is selected by selecting the service that has provided 701 in FIG. 7. The foregoing is a detailed description of the processing at step S504. The video distributing service provider 124 present in the second network 120 is thus selected based upon the communication-direction information 606 contained in the SDP information (definition information).

At step S504, one to a plurality of discovered services are narrowed down solely to candidates for appropriate services. In this embodiment, the three elements of media-type information 603, format information 604 and communication-direction information 606 are used. However, if it is possible to select a service, how many elements are used does not matter and the type of element used may be any element contained in the SDP information.

If a plurality of service candidates have been selected ("YES" at step S505) at the stage where processing up to step S504 has been completed, then processing for deciding a single service to be used is executed (step S506). If only the video distributing service provider 124 has been selected, step S506 is not executed. It should be noted that this processing can be implemented by presenting the list of candidates to the user and allowing the user to select the candidate using the user interface module 306 of the communication apparatus 121. Further, the processing of step S506 may select one of the services from among the video distributing service provider 124, video reproducing service provider 125 and print service provider 126 in accordance with a priority set beforehand by the service-content determination module 305.

The foregoing describes the details of the procedure through which the service used is selected on the side of the second network 120.

Described next will be an example of detailed operation involved in the procedure (S407 of the sequence diagram) for creating SDP information of a response.

Figure 9:
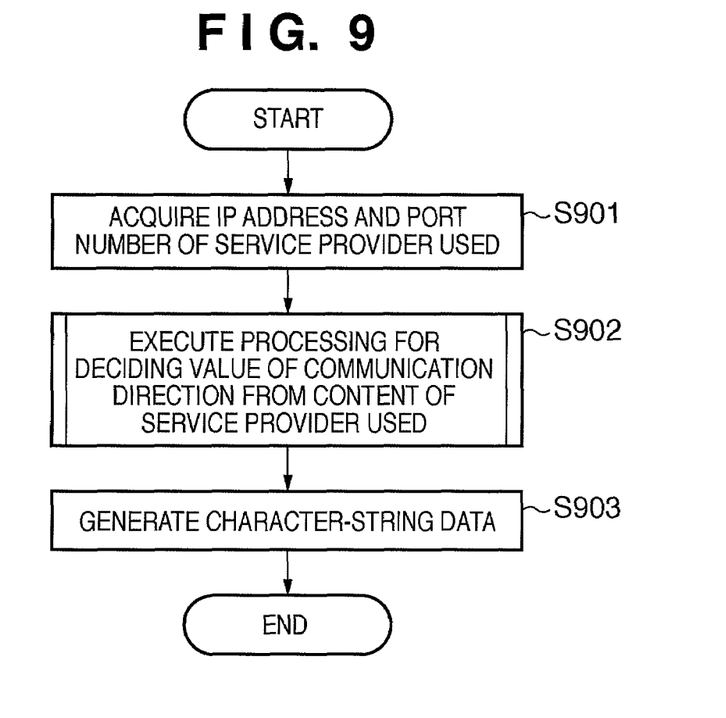
FIG. 9 is a flowchart of processing for generating SDP information of a response.

FIG. 9 is a flowchart illustrating the procedure for creating SDP information of a response.

First, the IP address and port number of the service are acquired using information 707 in the information 701 concerning the video distributing service provider 124 selected at S406 of the sequence diagram (step S901). The fact that the information 707 includes the service IP address and port number is within the limits of UPnP specifications. Next, the value of the communication direction is decided by the content of the service used (step S902).

The details of step S902 will now be described.

Figure 10:
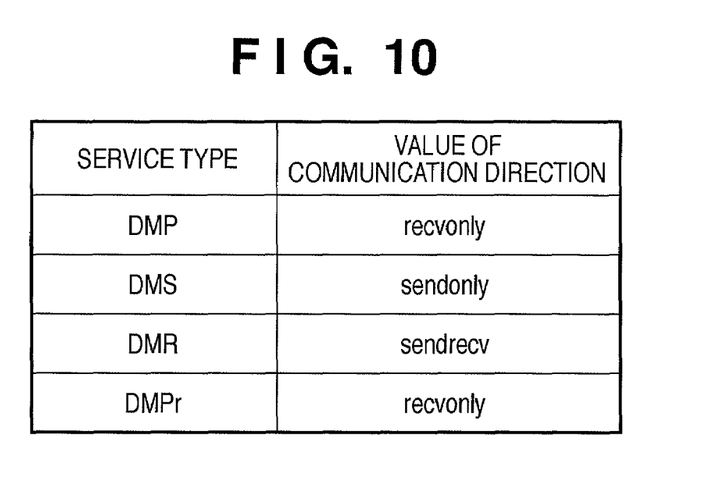
FIG. 10 is a table for a value of a communication direction.

First, the SDP processing module 303 is equipped with the table shown in FIG. 10. FIG. 10 illustrates a table 1001 that defines a rule for deciding the value of information concerning a communication direction conforming to the content of the service.

Information concerning communication direction is decided upon as "sendonly" by comparing the table 1001 and "DMS", which is the service information selected at S406 of the sequence diagram. Here "sendonly" means a service that transmits data. The foregoing completes step S902. By virtue of this step, the information concerning communication direction is decided from the type of service.

Finally, the information obtained at steps S901 and S902 is generated as a character string in the SDP information (step S903), and then processing is exited.

Figure 11:
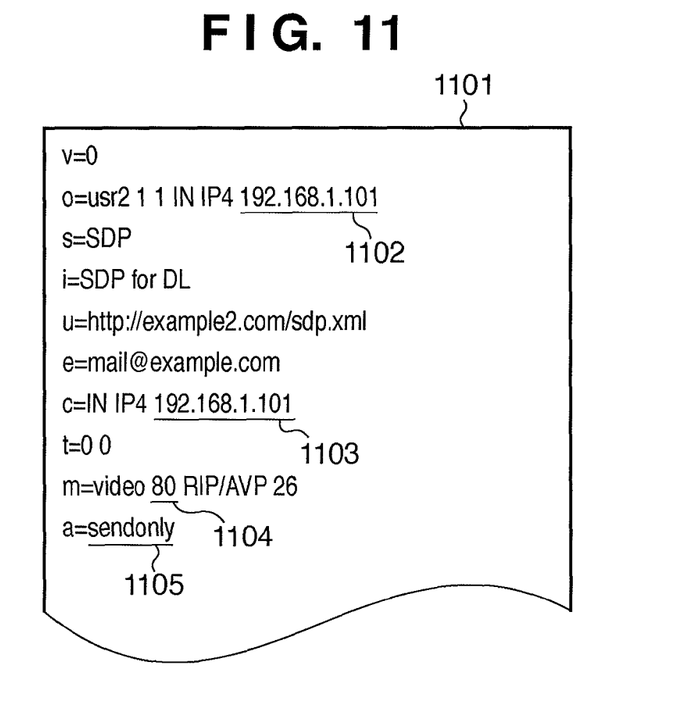
FIG. 11 illustrates SDP information attached to a final response in this embodiment.

The generated STP information is illustrated at 1101 in FIG. 11.

The IP address of the video distributing service provider 124 obtained at step S901 is indicated at character strings 1102 and 1103. Further, the protocol used by the video distributing service provider 124 is HTTP, and the port number is character string 1104. The information concerning communication direction obtained at step S902 is character string 1105.

The foregoing is a description of the details of the procedure for creating the SDP information of the response.

Thus, on the basis of the type (DMS) of video distributing service provider 124, the communication apparatus 121 generates second definition data (response SDP) that defines communication by the video distributing service provider 124. The response SDP includes information concerning the direction of communication by the video distributing service provider 124. Owing to the operation described above, a service suited to a service on the side that originates a connection request can be selected on the incoming side of the connection request.

Thus, the processing according to this embodiment includes a procedure (S406 in the sequence diagram) for selecting an appropriate service and a procedure (S407 in the sequence diagram) for generating response SDP information.

It should be noted that even in the generation of a call connection request by the communication apparatus 111 at step S401 of the sequence diagram, the video reproducing service provider 114 may generate SDP information from the publicly disclosed service information and attach this information to the call connection request in a manner similar to that shown in FIG. 9.

The scope of the present invention also covers the following form: Specifically, a recording medium storing the program code of software for implementing functions that include the processing of the sequence steps S406 and S407 described above is supplied to a system or apparatus. A computer (or CPU or MPU) of the system or apparatus reads out program code that has been stored on the recording medium and executes the program code. In this case, the program codes per se read from the recording medium implement the functions of the embodiment, and the recording medium storing the program codes constitutes the invention.

Examples of storage media that can be used for supplying program code are a flexible disk, hard disk, optical disk, magneto-optical disk, CD-ROM, CD-R, magnetic tape, non-volatile memory card, ROM and DVD, etc.

Further, besides the case where the aforesaid functions according to the embodiment are implemented by executing the read program code by computer, an operating system or the like running on the computer may perform all or a part of the actual processing so that the functions of the foregoing embodiment can be implemented by this processing.

Furthermore, after the program code read from the storage medium is written to a memory provided on a function expansion board inserted into the computer or provided in a function expansion unit connected to the computer, a CPU or the like mounted on the function expansion board or function expansion unit performs all or a part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-219922, filed Aug. 27, 2007, which is hereby incorporated by reference herein in its entirety.

What is claimed is:

1. A method of performing communication between a first network and a second network via a third network to which a router of the first network and a router of the second network are connected, said method comprising:
    transmitting a connection request including communication-direction information which is defined in a protocol for connecting between the first network and the second network and indicates the direction of communication of a first service provider that exists on the first network, from the first network to the second network via the third network using the protocol for connecting between the first network and the second network;
    searching, using a protocol used in the second network, for a second service provider which exists on the second network and which
    has a function corresponding to the communication-direction information defined in the protocol for connecting between the first network and the second network;
    forming, based on information which is defined in the protocol used in the second network and identifies the second service provider having the function corresponding to the communication-direction information, identification information which is defined in the protocol for connecting between the first network and the second network and identifies the second service provider having the function corresponding to the communication-direction information; and
    transmitting the identification information from the second network to the first network via the third network using the protocol for connecting between the first network and the second network.

2. The method according to claim 1, wherein said searching step searches for the second service provider which has a function corresponding to the communication-direction information, on the basis of predetermined correspondence relationship between the communication-direction information and the function.

3. The method according to claim 1, wherein the connection request, which includes the communication-direction information indicating the direction of communication of the first service provider that exists on the first network and defined in a protocol used in the first network, is transmitted from the first network to the second network via the third network.

4. A communication method in a second network different from a first network, said method comprising:
    receiving a connection request which is transmitted from a first network using a protocol for connecting between the first network and the second network;
    extracting information, which is defined in the protocol for connecting between the first network and the second network and relates to communication direction of a first service provider, from the received connection request;
    searching, using a protocol used in the second network, for a second service provider which exists on the second network and which
    has a function corresponding to the extracted information relating to the communication direction;
    forming, based on information which is defined in the protocol used in the second network and identifies the second service provider having the function corresponding to the extracted information relating to the communication direction, a response which is defined in the protocol for connecting between the first network and the second network and includes information relating to the direction of communication performed by the second service provider having the function corresponding to the extracted information relating to the communication direction; and
    transmitting the response to the first network using the protocol for connecting between the first network and the second network.

5. The method according to claim 4, wherein said searching step searches for the second service provider which has a function for performing communication in a direction opposite the direction of communication performed by the first service provider.

6. The method according to claim 4, wherein said forming step forms the response that includes the information relating to the direction of communication performed by the second service provider, based upon the function of the second service provider.

7. The method according to claim 4, wherein said searching step searches for the second service provider which has a function corresponding to the extracted information relating to the communication direction, on the basis of predetermined correspondence relationship between the extracted information relating to the communication direction and the function.

8. A communication apparatus on a second network different from a first network, said apparatus comprising:
    a receiving unit which receives a connection request which is transmitted from a first network using a protocol for connecting between the first network and the second network;
    an extracting unit which extracts information, which is defined in the protocol for connecting between the first network and the second network and relates to communication direction of a first service provider, from the connection request received by said receiving unit;

a searching unit which searches, using a protocol used in the second network, for a second service provider which exists on the second network and which
has a function corresponding to the extracted information relating to the communication direction;
a forming unit which forms, based on information which is defined in the protocol used in the second network and identifies the second service provider having the function corresponding to the extracted information relating to the communication direction, a response which is defined in the protocol for connecting between the first network and the second network and includes information relating to the direction of communication performed by the second service provider having the function corresponding to the extracted information relating to the communication direction; and
a transmitting unit which transmits the response to the first network using the protocol for connecting between the first network and the second network.

9. The apparatus according to claim 8, wherein said searching unit searches for the second service provider which has a function for performing communication in an opposite direction of the direction of communication performed by the first service provider.

10. The apparatus according to claim 8, wherein said forming unit forms the response that includes the information relating to the direction of communication performed by the second service provider, based upon the function of the second service provider.

11. The apparatus according to claim 8, wherein said searching unit searches for the second service provider which has a function corresponding to the extracted information relating to the communication direction, on the basis of predetermined correspondence relationship between the extracted information relating to the communication direction and the function.

12. A non-transitory computer readable storage medium storing a computer readable program for performing communication in a second network different from a first network, said program comprising:
   a receiving step of receiving a connection request which is transmitted from a first network using a protocol for connecting between the first network and the second network;
   an extracting step of extracting information, which is defined in the protocol for connecting between the first network and the second network and relates to communication direction of a first service provider, from the received connection request;
   a searching step of searching, using a protocol used in the second network, for a second service provider which exists on the second network and which;
   has a function corresponding to the extracted information relating to the communication direction;
   a forming step of forming, based on information which is defined in the protocol used in the second network and identifies the second service provider having the function corresponding to the extracted information relating to the communication direction, a response which is defined in the protocol for connecting between the first network and the second network and includes information relating to the direction of communication performed by the selected second service provider having the function corresponding to the extracted information relating to the communication direction; and
   a transmitting step of transmitting the response to the first network using the protocol for connecting between the first network and the second network.

13. The storage medium according to claim 12, wherein said searching step searches for the second service provider which has a function for performing communication in a direction opposite the direction of communication performed by the first service provider.

14. The storage medium according to claim 12, wherein said forming step forms the response that includes the information relating to the direction of communication performed by the second service provider, based upon the function of the second service provider.

15. The storage medium according to claim 12, wherein said searching step searches for the second service provider which has a function corresponding to the extracted information relating to the communication direction, on the basis of predetermined correspondence relationship between the extracted information relating to the communication direction and the function.

* * * * *